(12) United States Patent
Tewari

(10) Patent No.: US 11,675,516 B2
(45) Date of Patent: Jun. 13, 2023

(54) ANALYZING DISK CONFIGURATION FROM DYNAMIC VIRTUAL DISKS

(71) Applicant: EMC IP Holding Company LLC, Hopkinton, MA (US)

(72) Inventor: Abinas Tewari, Charlotte, NC (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 17/304,052

(22) Filed: Jun. 14, 2021

(65) Prior Publication Data

US 2022/0398028 A1     Dec. 15, 2022

(51) Int. Cl.
*G06F 3/00*      (2006.01)
*G06F 3/06*      (2006.01)

(52) U.S. Cl.
CPC .......... *G06F 3/0644* (2013.01); *G06F 3/0604* (2013.01); *G06F 3/0655* (2013.01); *G06F 3/0665* (2013.01); *G06F 3/0689* (2013.01)

(58) Field of Classification Search
None
See application file for complete search history.

(56) References Cited

U.S. PATENT DOCUMENTS

| 2017/0024152 | A1 | 1/2017 | Bhagi et al. | |
| 2019/0056890 | A1* | 2/2019 | Wookey | G06F 9/45558 |
| 2021/0133040 | A1* | 5/2021 | Bansal | G06F 11/1464 |
| 2022/0398028 | A1* | 12/2022 | Tewari | G06F 3/0655 |

* cited by examiner

*Primary Examiner* — Midys Rojas
(74) *Attorney, Agent, or Firm* — Workman Nydegger

(57) ABSTRACT

One example method includes extracting metadata from virtual disks. A virtual disk or logical volume is analyzed to identify the associated partitions. Volume configurations are determined for the partitions. The files for the partitions are remounted. The remounted files can be read based on their volume configurations and metadata can be extracted.

16 Claims, 15 Drawing Sheets

Disk /dev/sda: 976773168s
Sector size (logical/physical): 512B/2096B
Partition Table: msdos

| Number | Start | End | Size | Type | File System | Flags |
|---|---|---|---|---|---|---|
| | 63s | 2047s | 1985s | | Free Space | |
| 1 | 2048s | 1048596555s | 1048596555 | Primary | Ntfs | Boot |
| | 1048596565 | 1048616965 | 2040s | | Free Space | |
| 2 | 1048616966 | 1068154875 | 1953125s | Primary | | |
| | 1068148215 | 1068154875 | 667s | | Free Space | |
| 3 | 1068154885 | 9767731675 | 8699576805 | Extended | | Lba |
| | 1068155515 | 1068161845 | 634s | | Free Space | |
| 5 | 196817536s | 1146300355 | 78125005 | Logical | Ntfs | |
| 9 | 1146306565 | 2122869055 | 9765622505 | Logical | | |
| 10 | 2122874885 | 4220026955 | 2097152085 | Logical | Ntfs | |
| 6 | 4220047365 | 8414365045 | 4194304085 | Logical | Ntfs | |
| | 8414351445 | 8414365045 | 1361s | | Free Space | |
| 7 | 8414371845 | 9462947915 | 10485776085 | Logical | Ntfs | |
| 8 | 9462683255 | 9714626635 | 2516588325 | Logical | | |
| | 9714626645 | 9767731675 | 53105045 | | Free Space | |

```
[
    {
        "Partitions": [
            {
                "StartOffset": 1048576,
                "EndOffset": 1074790399,
                "OffsetInVol": 0,
                "Size": 1073741824,
                "BlockSize": 20971520,
                "Time": 1618501906,
                "Num": 1,
                "Filesystem": "ext2",
                "RawFileSystem": "ext2",
                "Fstype": "boot, type=83:",
                "PartitionType": "simple",
                "VmdkName": "Linux-flr-RHEL-7_6-1vm-ext2.vmdk"
                "MountPoint": "/home/abe/dev/esn/search-client/itests/vm-file-extractor/target/data/test-ext2-linear/mnt/Linux-flr-RHEL-7_6-1vm-ext2.vmdk",
                "VirtualMountPoint": " ",
                "DriveSignature": " ",
                "DiskKey": "2000"
            }
        ],
        "NumPartitions": 1,
        "Guid": " ",
        "Ldmtype": "Simple",
        "LogicalVolumeType": "simple",
        "StripeBlockSize": 0,
        "Size": 1073741824,
        "Time": 1618501906
    },
    {
        "Partitions":   [
            {
                "StartOffset": 1074790400,
                "EndOffset": 7510949888,
                "OffsetInVol": 1074790400,
                "Size": 7510949888,
                "BlockSize": 20971520,
                "Time": 1618501906,
                "Num": 1,
                "Filesystem": "ext2",
                "RawFileSystem": "ext2",
                "Fstype": "lvm, type=8e;",
                "PartitionType": "lvm",
                "VmdkName": "Linux-flr-RHEL-7_6-1vm-ext2.vmdk",
                "MountPoint": "/home/abe/dev/esn/search-client/itests/vm-file-extractor/target/data/test-ext2-linear/mnt/Linux-flr-RHEL-7_6-1vm-ext2.vmdk",
                "VirtualMountPoint": " ",
                "DriveSignature": " ",
                "DiskKey": "2000"
            }
        ],
        "NumPartitions": 1,
        "Guid": " ",
        "Ldmtype": "Linear",
        "LogicalVolumeType": " "
        "StripeBlockSize": 0,
        "Size": 8585740288,
        "Time": 1618501906
    }
]
```

*FIG. 6C*

ANALYZING DISK CONFIGURATION FROM DYNAMIC VIRTUAL DISKS

FIELD OF THE INVENTION

Embodiments of the present invention generally relate to computing operations including data protection operations. More particularly, at least some embodiments of the invention relate to systems, hardware, software, computer-readable media, and methods for virtual disk related operations including metadata extraction operations and cataloging operations.

BACKGROUND

Virtual machines (VMs) are similar to physical computers. Virtual machines have processors, memory, and disks and can connect to networks. However, virtual machines provide computing environments that are abstracted from the physical machine. A virtual machine is, in effect, a file that is managed by a hypervisor and that exhibits the behavior of a physical computer.

In effect, virtual machines are software implementations of physical machines. This allows, for example, several virtual machines to run on the same physical machine. A virtual machine may also have virtual disks (e.g., VMDKs). A virtual disk is a file or set of files that appears as a physical disk drive.

Data associated with virtual machines, much like data stored in a physical machine, can be protected by performing operations such as backup operations. Backup operations ensure that the virtual machines can be recovered if necessary. Extracting information from virtual machines or virtual disks including backups thereof efficiently is difficult.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 4 discloses aspects of partition information;

FIG. 6C discloses aspects of a volume configuration;

DETAILED DESCRIPTION OF SOME EXAMPLE EMBODIMENTS

Embodiments of the present invention generally relate to computing operations including data protection operations. Embodiments of the invention may also be implemented in systems or applications other than data protection systems and applications. At least some embodiments of the invention relate to systems, hardware, software, computer-readable media, and methods for data protection operations including cataloging operations, metadata extraction operations, and the like. Embodiments of the invention may be used when performing data protection operations on virtualized environments including virtual machines.

In one example, an extraction engine is provided that is configured to extract metadata from virtual machines or from virtual disks. The extraction engine may extract metadata from virtual disks while a data protection operation (e.g., a backup operation) or other operation is being performed, after the data protection operation is performed, or the like.

The extraction engine may extract metadata from the virtual machines (or more specifically from the virtual disks) and add the extracted metadata to a metadata database. This database, which is an example of a catalog, can be used to perform searches and other operations. Extracting the metadata and writing the extracted metadata to a metadata database is an example of a cataloging operation.

Extracting metadata from virtual machines (or the files that constitute the virtual machine) is complicated at least because the virtual disks are an abstraction of the underlying physical disk, which itself may include one or more physical volumes. More specifically, a physical volume may be a physical storage disk or device or a partition thereof and one or more physical volumes may be initialized on a physical disk. Each partition may be a physical volume. At the same time, a physical volume may include more than one physical disk.

A logical volume, often used by virtual machines, may present a continuous address space to the virtual machine but may include one or more physical volumes. The abstraction allows the physical volumes to be mapped to the logical volumes.

Figure 1A:
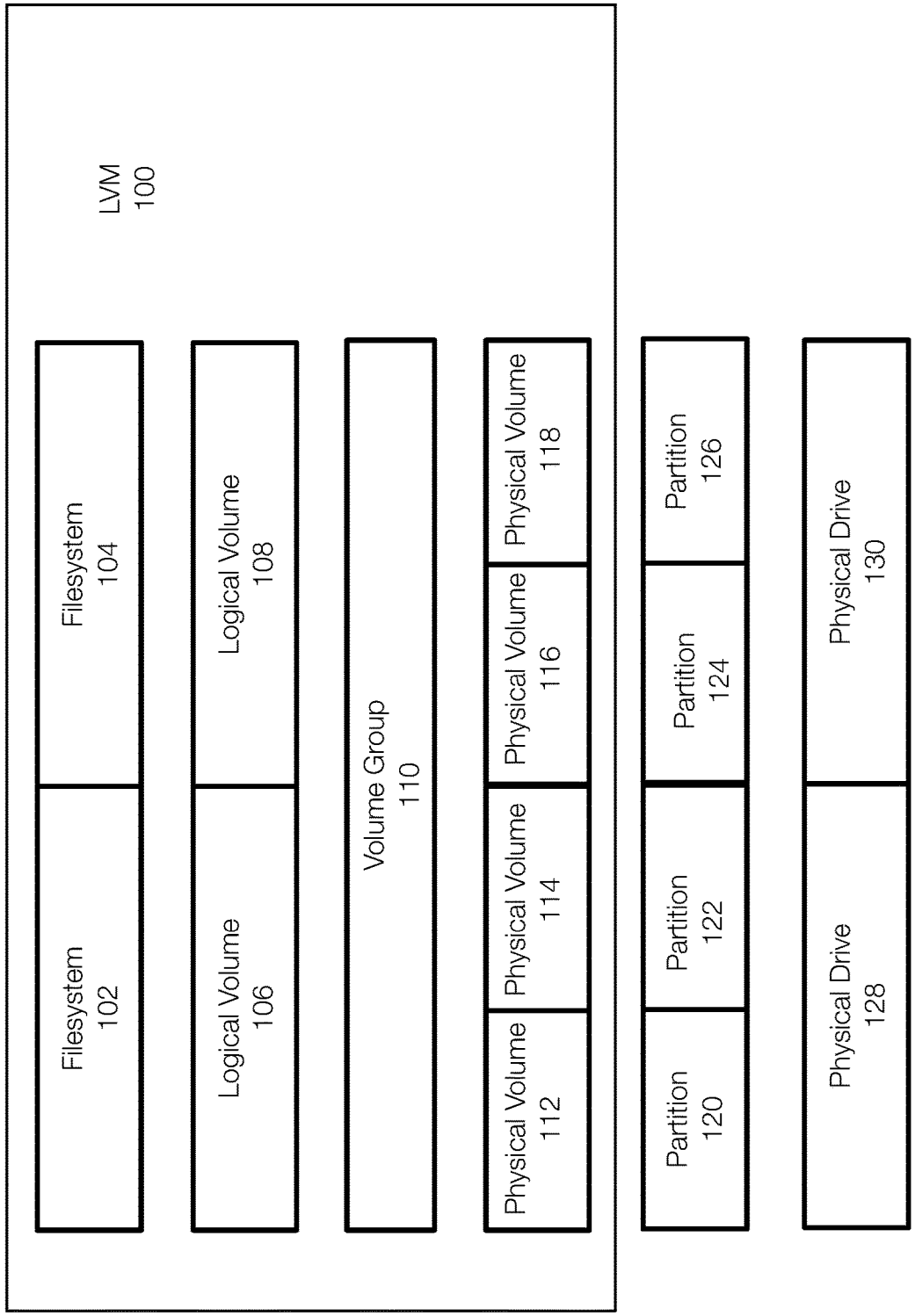
FIG. 1A discloses aspects of a device mapping framework.

FIG. 1A discloses aspects of a device mapping framework. FIG. 1A illustrates logical volume management (LVM) but embodiments of the invention are not limited thereto.

FIG. 1A illustrates LVM 100. In this example, filesystems 102 and 104 (e.g., ext2, ext3) are mounted on or associated with, respectively, logical volumes 106 and 108. The logical volumes 106 and 108 are part of a volume group 110. In this example, the volume group 110 is mapped to or associated with physical volumes 112, 114, 116, and 118. The physical volumes 112, 114, 116, and 118 are associated with, respectively, partitions 120, 122, 124, and 126. The partitions 120 and 122 are located on a physical drive 128 and the partitions 124 and 126 are located on a physical drive 130. FIG. 1A thus illustrates a relationship between the physical drives and physical partitions to the logical volumes and filesystems that are presented to a device such as a virtual machine.

Figure 1B:
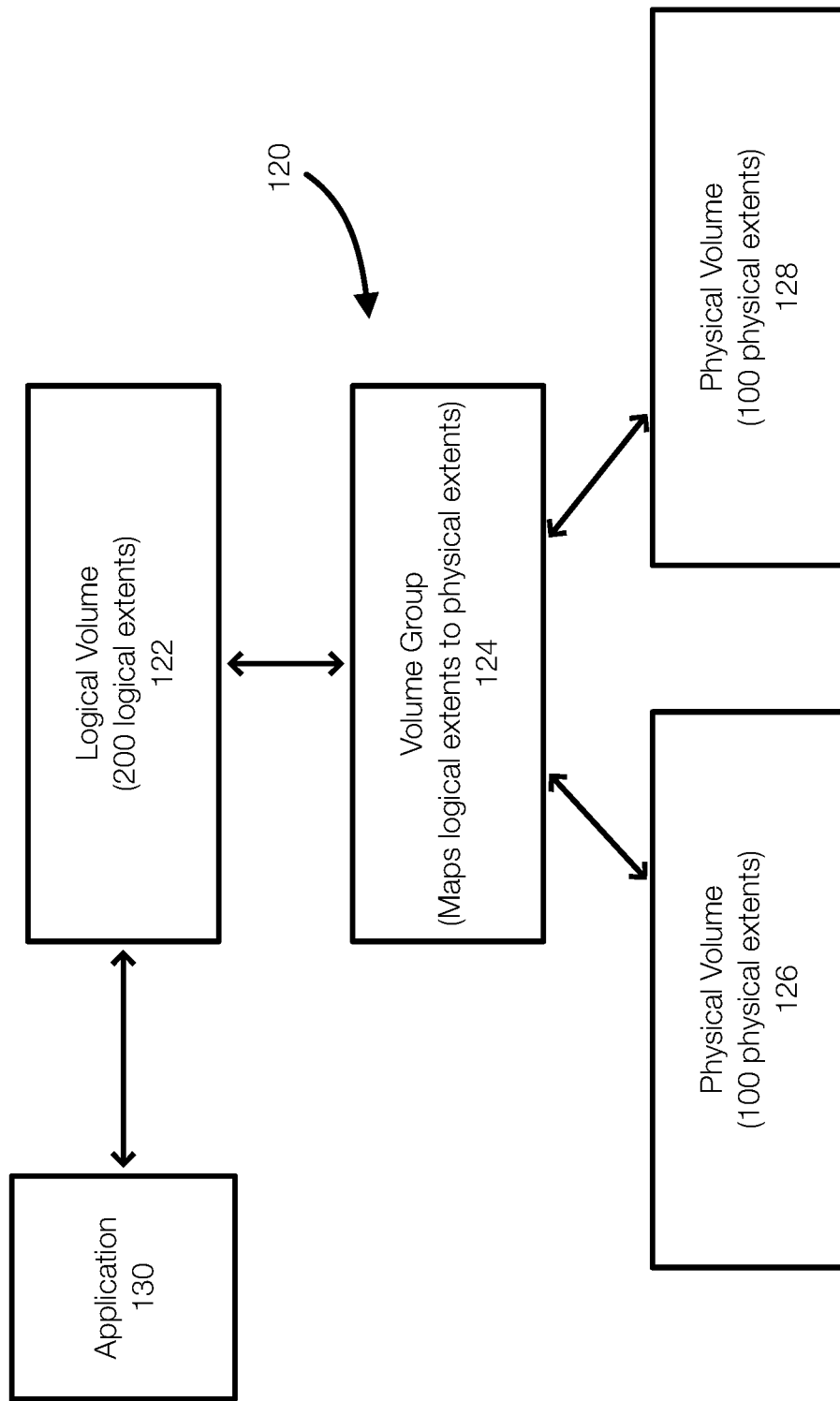
FIG. 1B discloses aspects of a linear volume configuration.
Figure 1C:
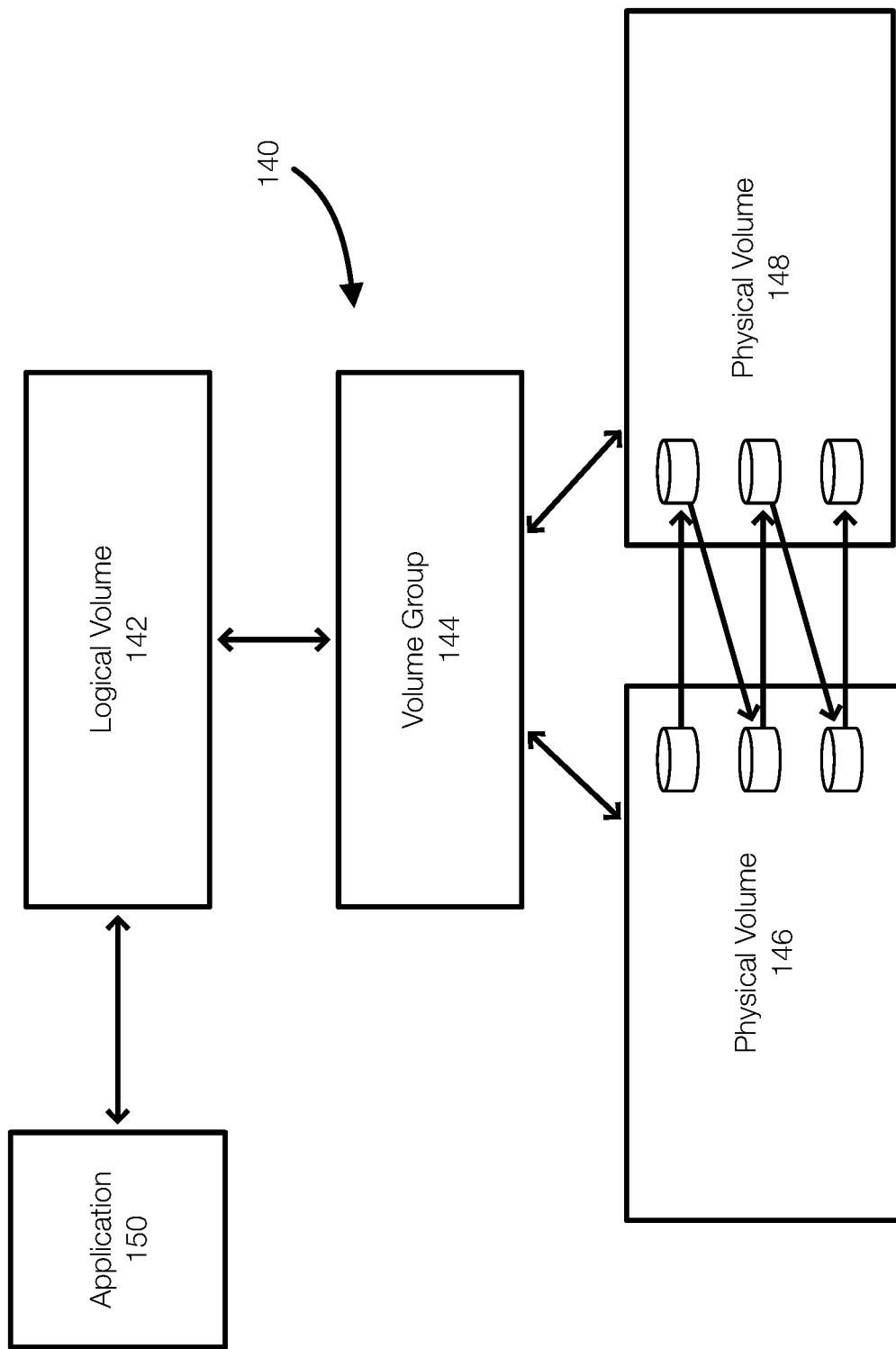
FIG. 1C discloses aspects of a striped volume configuration.
Figure 1D:
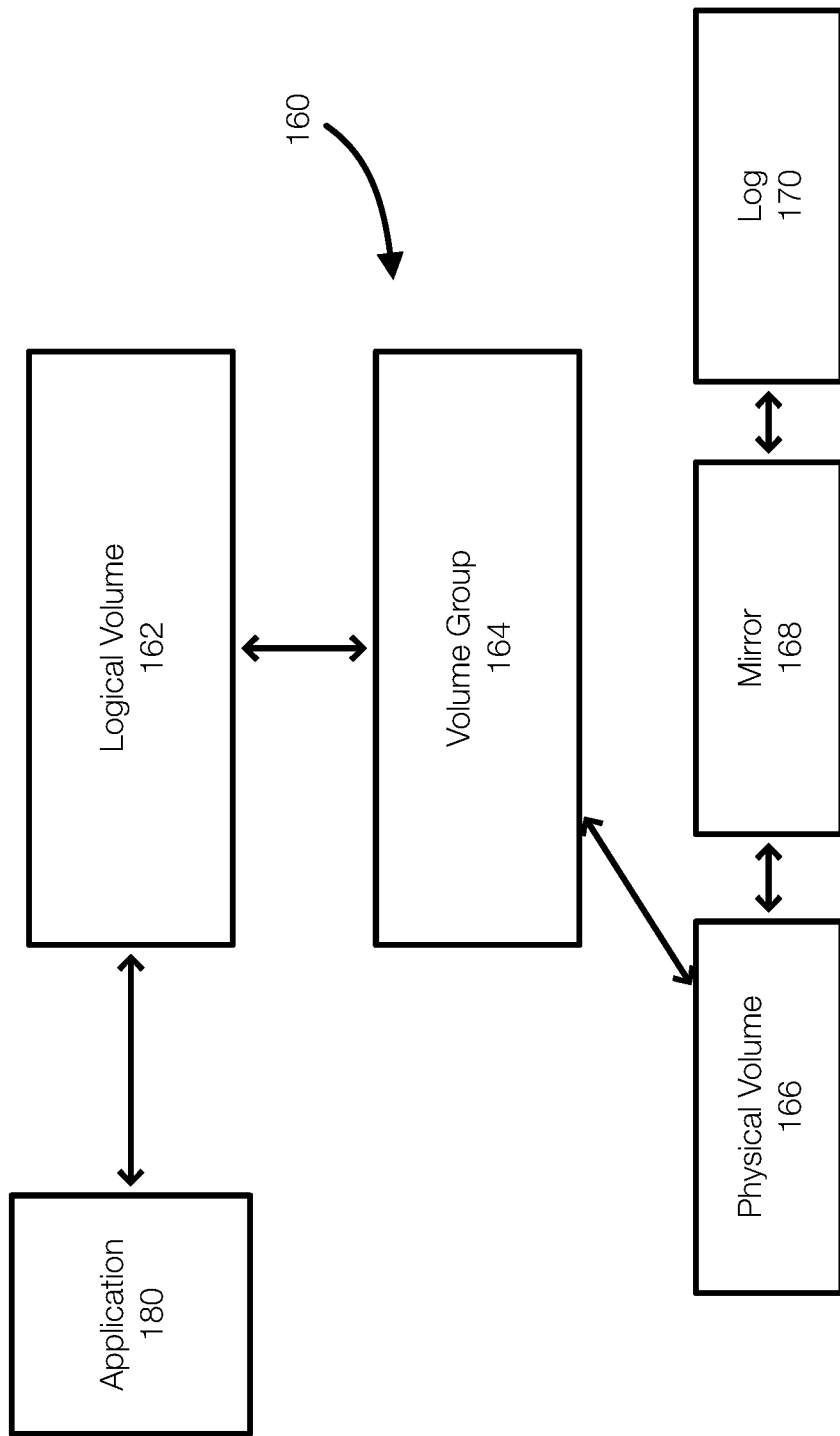
FIG. 1D discloses aspects of a mirrored volume configuration.

The volumes illustrated in FIG. 1A may have different volume configurations. FIG. 1B illustrates an example of a linear volume configuration, FIG. 1C illustrates an example of a striped volume configuration, and FIG. 1D illustrates an example of a mirrored volume configuration. These volume configurations are described by way of example only and not limitation.

FIG. 1B illustrates a linear volume configuration. The configuration 120 establishes a relationship or mapping between a logical volume 122 and the underlying physical volumes 126 and 128. In this example, the physical volumes 126 and 128 each include 100 extents. An extent, by way of example, is a chunk of data or refers to a size (e.g., 4 MB) of the chunk. Alternatively, an extent also refers to a portion of a physical disk drive or a contiguous area of storage. Typically, logical extents and physical extents in a given system have the same size.

In FIG. 1B, the volume group 124 includes the physical volumes 126 and 128. The logical volume 122 presents the extents of the physical volumes 126 and 128 in a continuous manner. Thus, extents 1-100 of the logical volume 122 may map to the extents in the physical volume 126 and extents 101-200 of the logical volume 122 may map to the extents of the physical volume 128. From the perspective of an application 130, there is only one device (the logical volume 102) that is 200 extents in size in this example.

FIG. 1C illustrates an example of a striped volume configuration. The configuration 140 includes a relationship between the logical volume 142 and the physical volumes 146 and 148. The physical volumes 146 and 148 are part of the volume group 144 and the logical volume 142 is part of the volume group 144. In FIG. 1C, the data is striped across two physical volumes 126 and 128. Thus, the first stripe is written to the physical volume 146, the second stripe is written to the physical volume 148, and so on. In this example, the size of the stripe does not exceed the size of an extent. From the perspective of the application 150, a single device is available—the logical volume 142.

FIG. 1D illustrates an example of a mirrored volume configuration. In this example, the volume group 164 in the configuration 160 includes or is associated with a physical volume 166, which is associated with a mirror volume or mirror 168. A log 170 may be used to keep track of which regions are in sync on the mirror 168 (or mirrors). The log 170 may be kept on disk and may be persistent across reboots. The logical volume 162 is a single device from the perspective of the application 180.

By way of example only, these configurations may be managed using an LVM (Logical Volume Manager). LVM is an example of a manager that allows a hard drive(s) to be allocated to one or more physical volumes, which can be combined or arranged into one or more logical volumes. The logical volumes may be assigned mount points (e.g., / home, /) and may include file systems such as, by way of example only, ext2 or ext3.

Embodiments of the invention are configured to extract metadata from a logical volume or, ultimately, data residing on physical disks. An extraction engine is configured to read the underlying physical partitions and extract the relevant metadata (or other metadata/data). Embodiments of the invention facilitate this process such that the relevant partitions can be read, in one example, continuously. Generally, this is achieved by analyzing the logical volume configuration information or analyzing the virtual disk to determine the volume configuration. The volume configuration relates to the manner in which the data is stored on the partitions. Once the volume configuration is determined, a read strategy is selected based on the volume configuration. More specifically, the metadata can be extracted using a read operation that accounts for the volume configurations.

Figure 2:
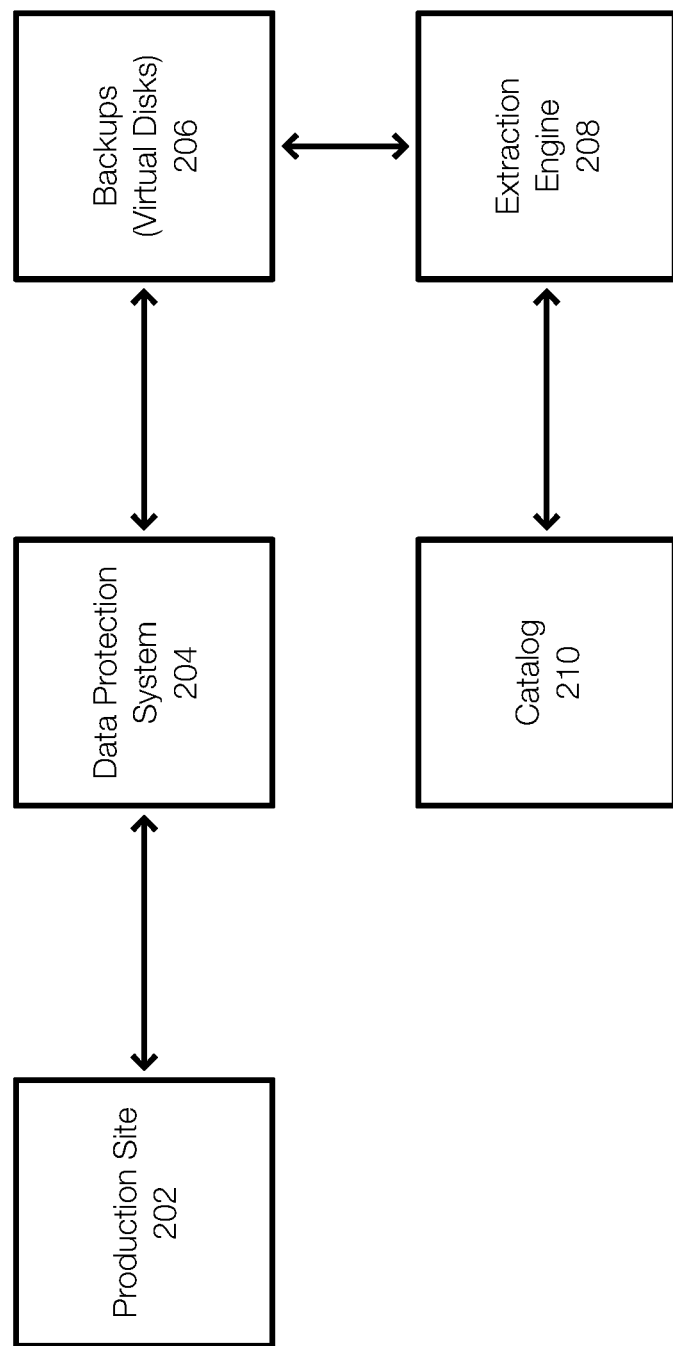
FIG. 2 discloses aspects of a data protection system that includes or is associated with an extraction engine configured to extract metadata from a virtual disk or a logical volume.

FIG. 2 discloses aspects of a data protection system configured to perform computing operations including data protection operations. FIG. 2 illustrates an example of a data protection system 204 that performs data protection operations including backup operations and restore operations. The data protection system 204 is configured to protect a production site 202.

The production site 202 may include various configurations of computing resources including servers, storage, memory, processors, networking equipment and the like. The production site 202 may also include virtualized computing resources such as virtual machines and virtual disks (e.g., VMDK disks).

In one example, the data protection system 204 may generate backups of the production site, which may include backing up virtual machines including their virtual disks. When backing up virtual machines, backups 206 may be generated. The backups 206 may include backups of virtual disks or virtual machines. The backups 206 may be stored in a storage of the data protection system 204 and may also be replicated to other storage such as cloud-based storage.

By way of example only, the data protection system 204 may include or be associated with an extraction engine 208. The extraction engine 208 is configured to extract metadata from virtual machines or virtual disks. The extraction engine 208 may extract metadata from the virtual disks during the backup operation or after the backup operation or at any desired time.

The extracted metadata may be added to a catalog 210 (e.g., a database) of file system metadata. This allows searching operations to be performed that are relevant or related to the backups 206 or to the virtual disks from which metadata was extracted. For example, the catalog 210 can be searched for specific files, versions of files, or the like.

Generally, extracting metadata from a virtual disk includes analyzing the virtual disk (or logical volume) to identify the physical partitions (or disks) that correspond to the virtual disk. Once the partitions are identified, the partitions or disks may be traversed to obtain volume metadata. The metadata can be processed and analyzed to ascertain volume configuration and partition offsets. This allows the partitions or physical disks to be mapped to logical volumes and allows the partitions or disks to be served as logical partitions through a single interface, such as FUSE (Filesystem in user space) as one or more mounted files.

Once these files are mounted in the interface, the metadata can be extracted. To extract the metadata, the mounted files are read in a manner that is consistent with the associated volume configuration. Thus, spanned, linear, striped, simple, and RAID volume configurations may be read in different manners to account for their differences. Each logical partition may be read based on the associated volume configuration.

Figure 3:
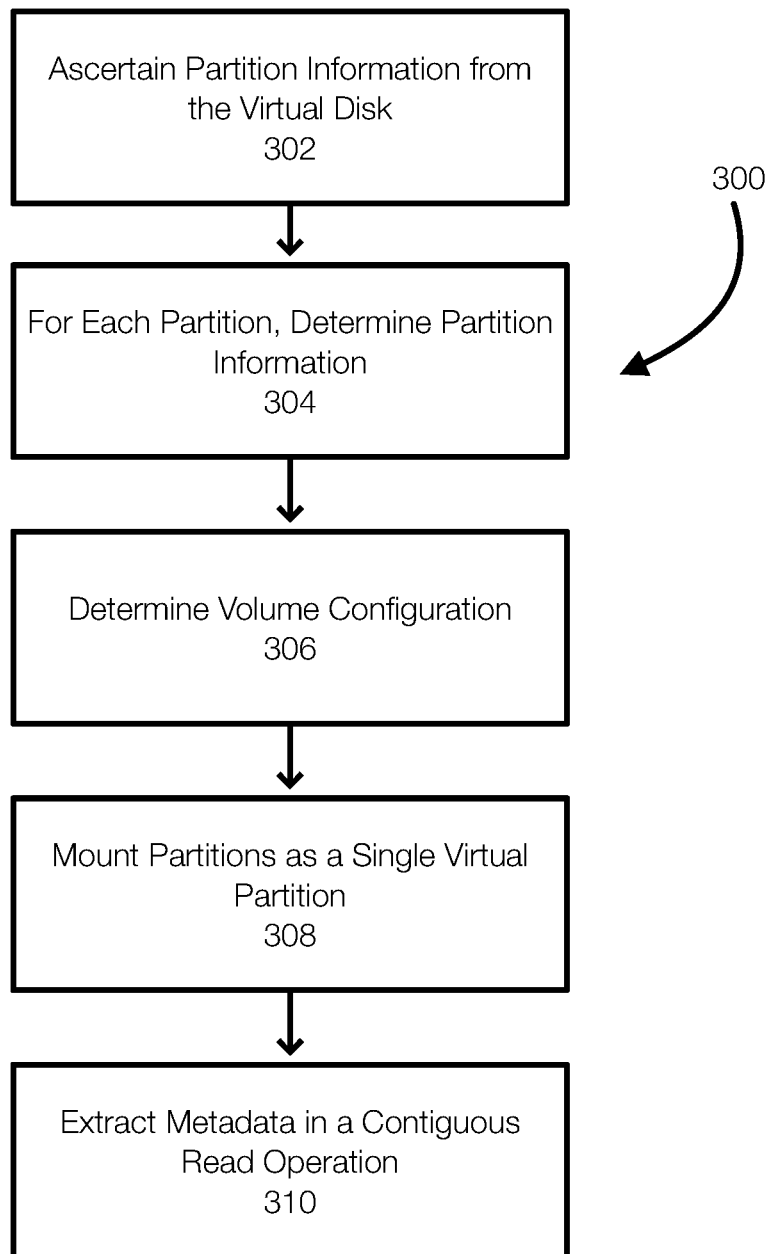
FIG. 3 discloses aspects of a method for extracting metadata from a logical volume.

FIG. 3 discloses aspects of a method 300 for obtaining or extracting metadata from a virtual disk or a backup of a virtual disk or a logical volume. Initially, a virtual disk may be analyzed to ascertain 302 partition information for a virtual disk or for a logical volume. If a virtual machine has more than one logical volume, the method 300 may ascertain 302 partition information for each of the logical volumes. This may include identifying the partitions that make up the logical volume.

Next, partition information for each partition is determined 304. FIG. 4 illustrates an example of partition information. The partition information 400 may include, by way of example only, start sector, end sector, partition size, partition type, file system, and flags. For example, partition 1 is a primary partition and is a boot partition.

Returning to FIG. 3, the volume configuration for each of the partitions is determined 306. For example, this may include determining whether the volume configuration is simple, spanned, striped, mirrored, or the like. This may also include determining whether combinations of volume configurations are in use.

After the volume configurations are determined, the partitions are mounted 308 as a logical volume. More specifically, this allows each partition to be represented by a file that can be mounted as a logical partition. The logical partitions may constitute a single logical volume. This allows metadata to be extracted 310 from the single partition (or volume) in a contiguous read operation while accounting for the various volume configurations.

Figure 5:
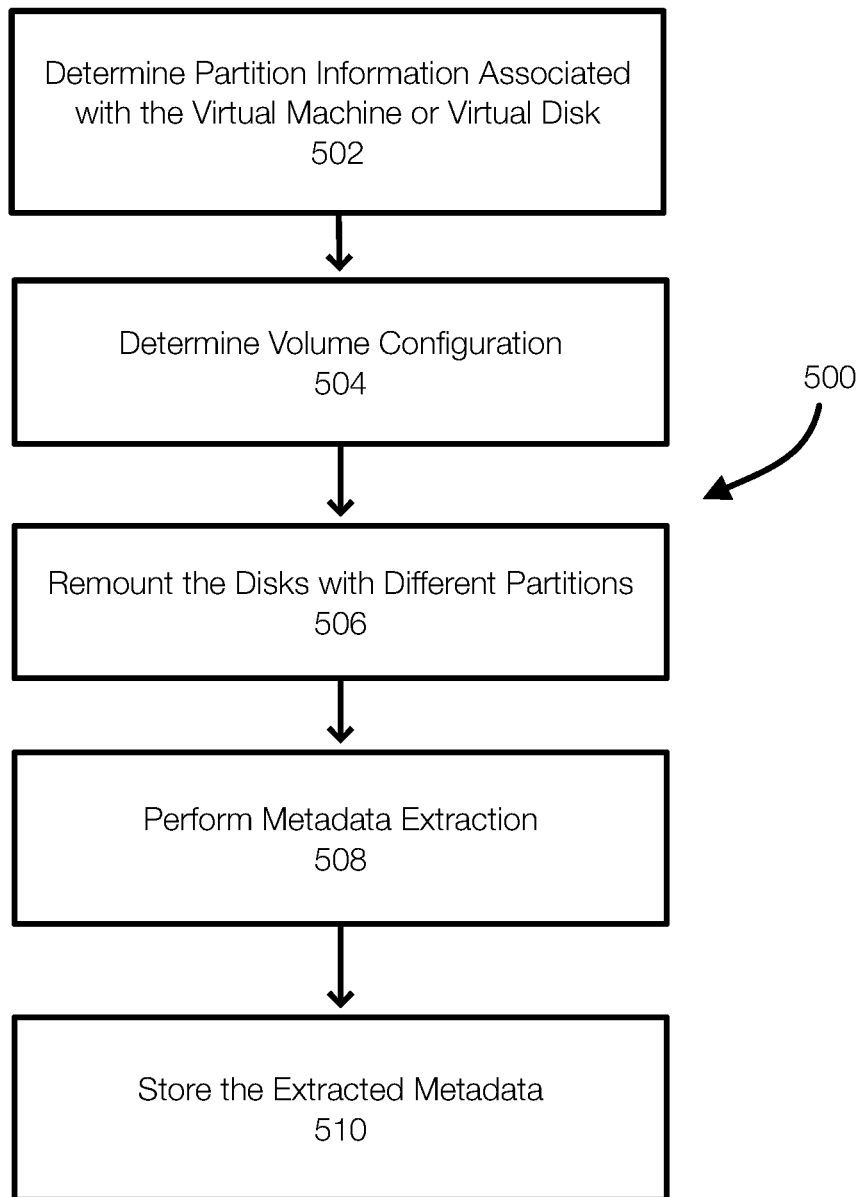
FIG. 5 discloses aspects of extracting metadata from a virtual disk or a logical volume.

FIG. 5 discloses aspects of a method for extracting metadata from a virtual machine or a virtual disk (also referred to as a logical volume). Generally, an extraction engine is configured to extract metadata from virtual machines or the associated virtual disks or logical volumes. The metadata can be extracted as a backup is being performed, or after the backup is performed, or the like. The metadata extracted can be added to a library or catalog of file system metadata. This database or catalog is suitable for searching.

When extracting metadata, the virtual disks (or logical volumes) to be processed are identified and then evaluated to determine 502 the partition information for the logical volumes. An example of the partition information 300 is illustrated in FIG. 3. The partitions are further evaluated to determine configuration information. For example, if the partitions have an LVM configuration, the partitions may be parsed to determine 504 volume configurations (e.g., striped, simple, spanned, mirror).

Figure 6A:
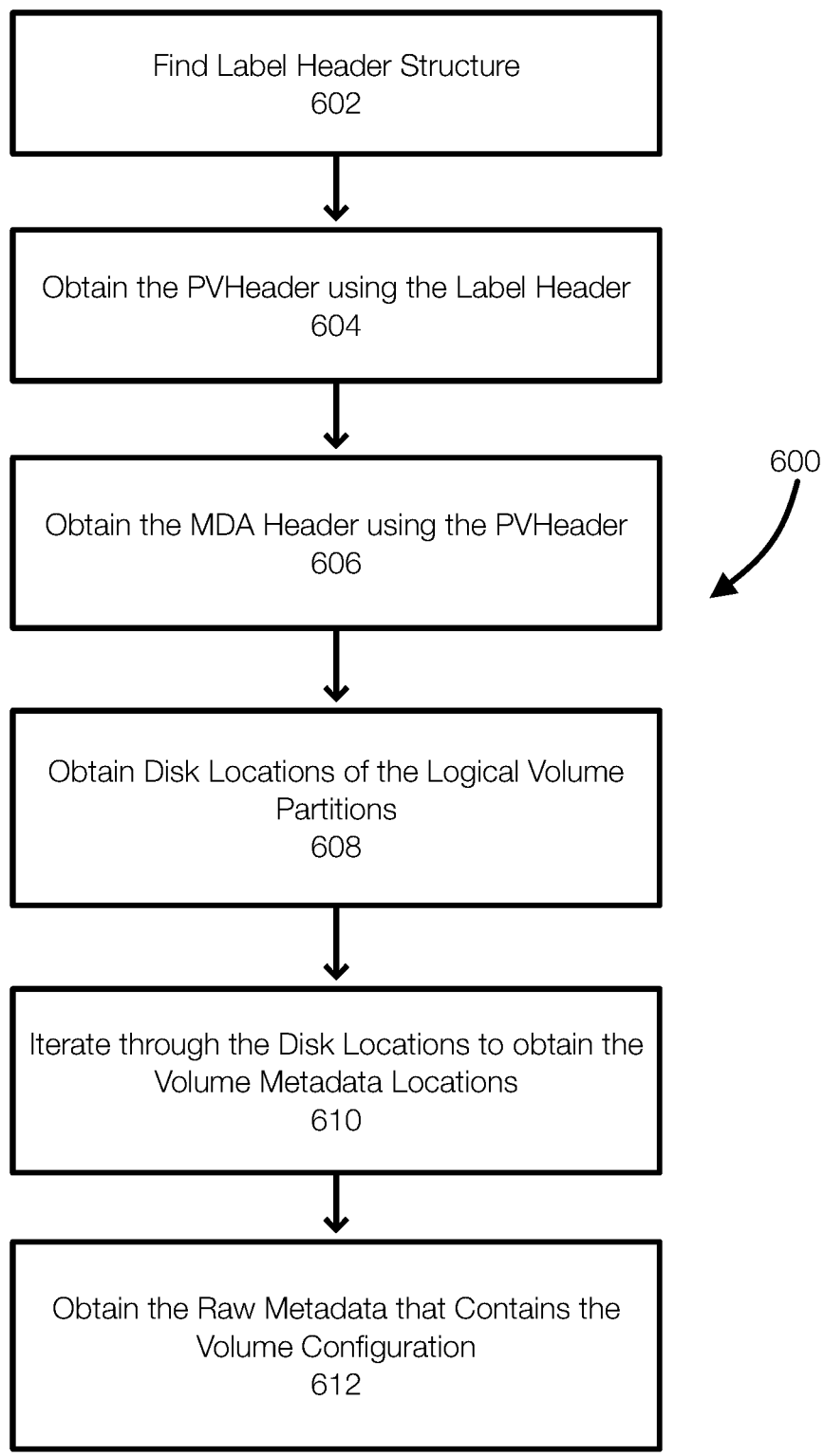
FIG. 6A discloses aspects of determining a volume configuration.

FIG. 6A illustrates an example of determining 504 the volume configuration. Initially, the label header structure is found for the virtual disk or the logical volume. By way of example only, the label header structure may be found in the first 4 sectors (512 byte sectors) of the physical disk. The PVHeader (Physical Volume Header) is obtained 604 using the label header structure. The PVHeader may include a list of data area descriptors and a list of metadata area descriptors.

The MDA (Metadata Area) header 606 is then obtained using the PVHeader. The MDA header may include a list of raw location descriptors. The disk locations of the logical volume partitions can be obtained from the MDA header. Next, the disk locations can be evaluated to obtain 610 the volume metadata locations 610. The raw metadata that contains the volume configuration can then be obtained 612.

Figure 6B:
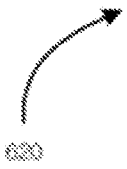
FIG. 6B discloses aspects of raw metadata from which volume configuration may be determined.

The raw metadata may include a contents area, which may have key/value data structures. An example of the raw metadata obtained in this manner is illustrated in FIG. 6B. FIG. 6B illustrates metadata 620 that identifies the volume configuration. The metadata 620 includes the data needed to map logical volume lookups to physical volume sectors. Using the partition information 300 and the metadata 620, the volume configuration 630 can be constructed.

FIG. 6C illustrates an example of a volume configuration 630 generated from the partition information 300 and the metadata 620.

Figure 6D:
FIG. 6D discloses aspects of files associated with the volume configuration.

FIG. 6D illustrates an example of files that are related to the volume configuration and served or mounted for metadata extraction purposes. More specifically, FIG. 6D illustrates an example of files 640 that represent the different partitions within the disks that are part of the original logical volume, with offsets and sizes as determined from the volume configuration 630 or from the partition information 300 and the metadata 620. The files include a file 642 and a file 644.

More specifically, FIGS. 6A-6D illustrates how the volume configuration 630 of a virtual disk 646 (e.g., Linux-flr-RHEL-7_6-lvm-ext2.vmdk) is used to mount files 642 and 644 to a mount point. The files 642 and 644 represent the different partitions within the disks that were determined as illustrated in FIG. 6A. These files can be mounted as logical volumes.

These files are mounted to a mount point and, in this example the original virtual disk 646 is represented by or includes the files 642 and 644. As illustrated in FIG. 6D, the file name includes information about the file. In this example, disk 2000 is a disk key and linear (or simple) is the volume configuration type. The file names include the start offset within the original disk of the relevant partition and the size of the partition. The file system type, flags, and number are also included in the file name.

In this example, once the volume configuration has been ascertained, the virtual disks are remounted, but with different files representing the different partitions within the disks. In other words, embodiments of the invention allow a logical volume to be processed to facilitate the extraction of metadata. By way of example only, each of the files generated as discussed herein (e.g., files 642 and 644) correspond to a particular partition and a particular volume configuration. When these files are presented or mounted as a logical volume, the read operation can read the metadata continuously from the files 642 and 644 while accounting for the volume configuration. For example, the method for reading a simple or linear volume configuration is different from the method for reading a striped volume configuration.

Returning to FIG. 5, once the volume configuration 630 has been determined and the logical volume or virtual disk has been remounted, the metadata may be extracted 508. The extracted metadata is then stored 510 in a catalog or database.

Metadata is extracted using a read operation to read the files. Because the volume configurations are known, the read operation can be performed efficiently and in a manner that accounts for the volume configuration. For linear volume configurations, the disks or partitions may be concatenated such that reads will start from an initial disk and then go into other disks (or partitions). For striped volume configurations, reads interleave with different disks based on the strip block size and the number of disks that have been configured. For mirrored volume configurations, one of the mirrored disks or partitions is read and the others can be ignored. The read strategy is based on the determined volume configuration.

Figure 7:
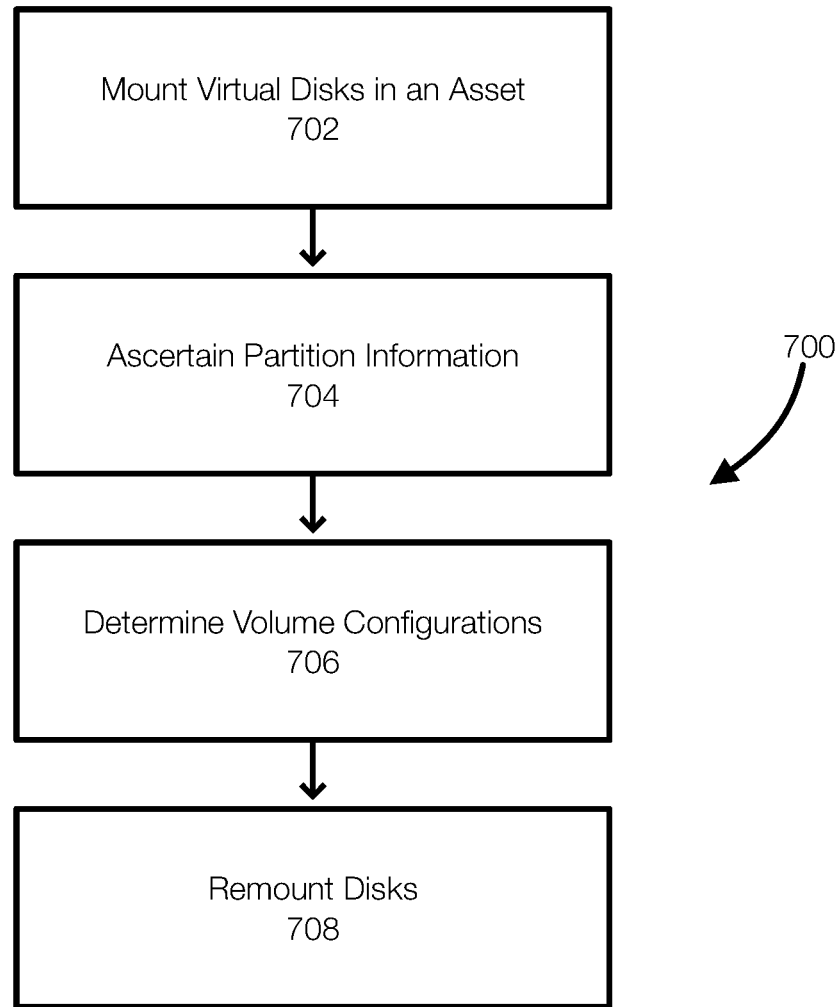
FIG. 7 discloses aspects of a method for providing an interface for extracting metadata from multiple workflows.

FIG. 7 discloses aspects of a method for serving a virtual filesystem or such that metadata can be extracted from the filesystem. Embodiments of the invention further provide a single interface for running a file extraction process against multiple workflows. For example, this single interface can be used to extract metadata from virtual disks in different environment such as production environments (e.g., vCenter), data protection environments (e.g., Data Domain), and local hot-add mounted disks. In one example, the method 700 may begin by mounting 702 virtual disks in an asset. Once the virtual disks are mounted, partition information is ascertained 704. The volume configurations for these partitions are then determined 706. Based on the volume configurations, the disks are remounted 708 by providing a single virtual file or logical volume. In some examples, multiple files may be remounted.

Figure 8:
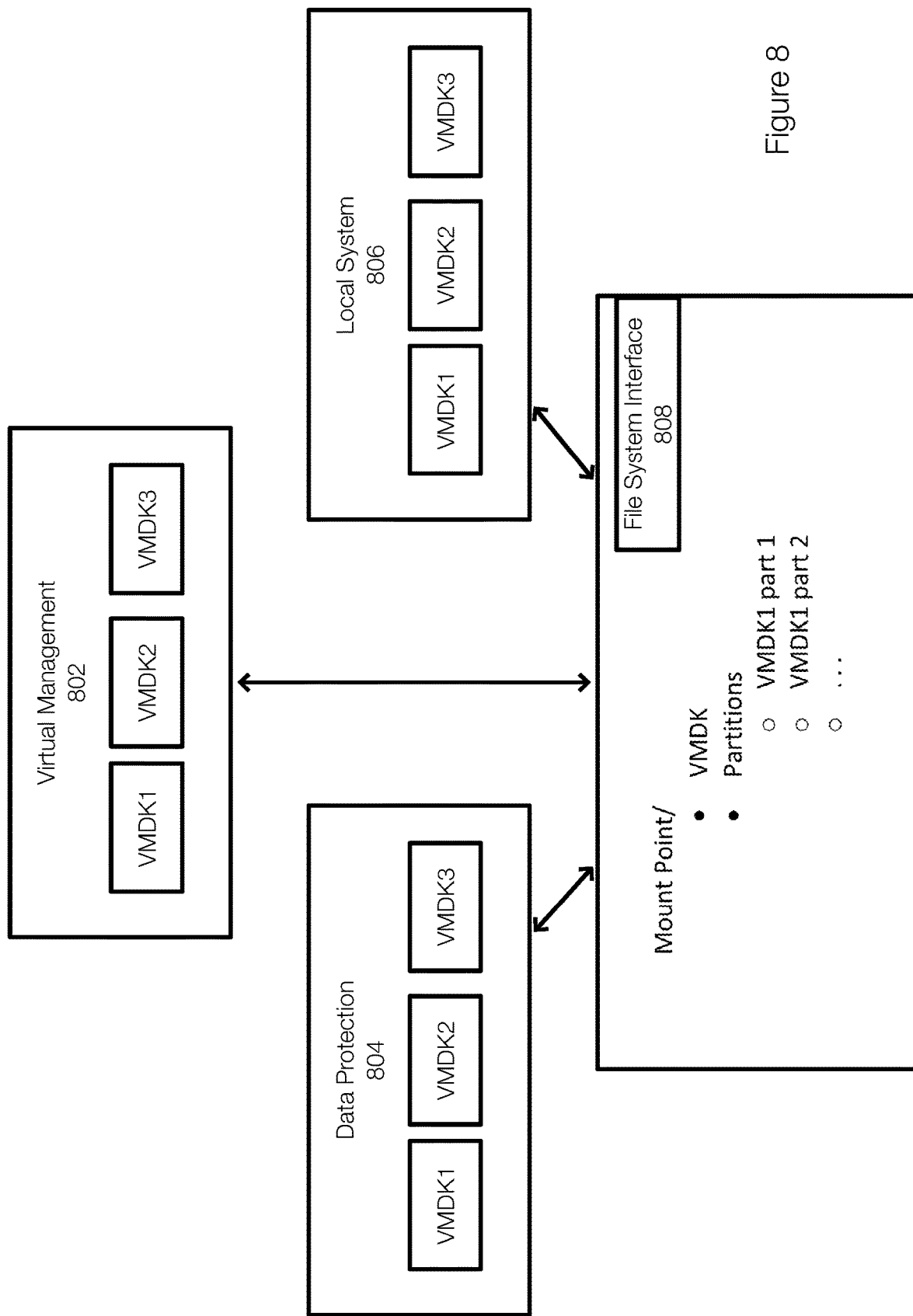
FIG. 8 discloses aspects of an interface for extracting metadata.

FIG. 8 discloses aspects of an interface for extracting metadata. In FIG. 8, a file system interface 808 is provided and allows a process for handling operations from multiple workflows or systems. More specifically, the file system interface 808 is configured to operate with, by way of example only, a data protection system 804 (e.g., DataDomain), a virtual management system 802 (e.g., vCenter), and a local system 806 (e.g., hot-add).

The file system interface 808 may be able to create a mount point that includes the files that correspond to the virtual disks (VMDKs) that may have been specified in input parameters. In this example, the parameters may have specified VMDK1, VMDK2, and VMDK3 from each of the virtual management 802, the data protection system 804, and the local system 806.

The file system interface 808 may use different application programming interfaces (APIs).

Thus, the file system interface 808 may use a data protection API to mount the VMDK1, VMDK2, and VMDK3 of the data protection system 804. The data protection API may require a username, password, storage path, and the like. These VMDK files are served as virtual files in the mount point of the file system interface 808. This allows the VMDK files to be accessed and read according to the appropriate protocols and using the appropriate calls. For example, reads of a virtual file may be routed, by the file system interface 808, to callback functions which used the appropriate read APIs. The VMDK files on the virtual management 802 and the local system 806 may be similarly accessed and read using corresponding APIs. With the local system 806, the file handle may be used to read the relevant files.

Once the files are mounted to the file system interface 808, which may be in user space, the files or VMDKs may be analyzed to determine partition information for each of the disks. Next, the disks or partitions are analyzed to determine the volume configurations. Once this information is acquired, the VMDK files are remounted based on partition offsets and volume configuration information. This allows the disk volumes to be served in a contiguous manner so that the extraction engine can read the disk as a simple disk. For some partitions (e.g., RAID partitions), a virtual volume may be served or mounted. As previously discussed, the read method is adapted to the volume configuration.

Advantageously, the partition information and volume information determinations or calculations are hidden and a single interface such as the file system interface 808 may be used to perform extraction operations.

Figure 9:
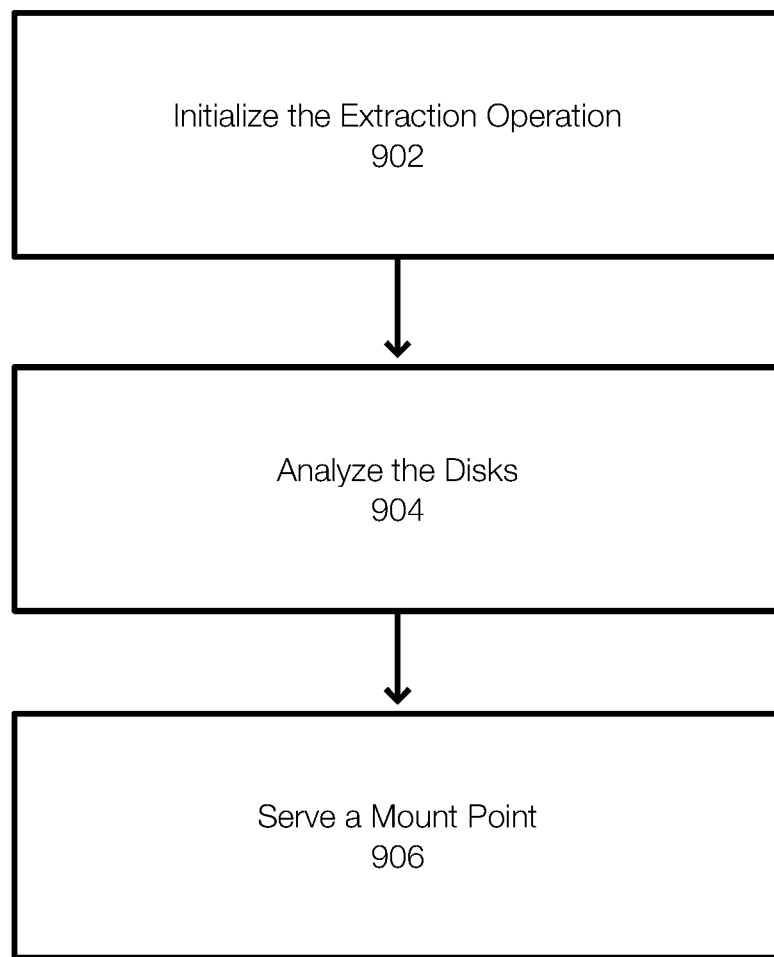
FIG. 9 discloses aspects of a file system flow for performing operations such as extraction operations on files such as virtual disk files.

FIG. 9 discloses aspects of a file system flow. Initially, an operation such as an interface operation is initialized 902. This may include initializing protocols and opening connections to listed virtual disks (e.g., VMDK files). Initializing the operation through the interface may also include creating and serving an initial mount point that shows the VMDKs as files within the mount directory.

Next, the disks (or mounted files) are analyzed 904. This may include parsing the disks to determine or ascertain the partitions. This may also include obtaining raw metadata to determine the volume configurations. The drive signature may also be obtained.

Next, based on the collected information, a new mount point is opened and served 906. The new mountpoint shows the individual partitions as individual files. The drive signature or volume GUID may be shown in the file name.

To perform an extraction operation, the files listed on the new mount point may be read based on their volume configurations as previously described.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of computing operations including data protection operations. Such operations may include, but are not limited to, metadata extraction operations, mounting operations, parsing operations, disk analysis operations, volume configuration determination operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example. Embodiments of the invention may also operate in the context of containers and containerized applications.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

It is noted with respect to the example method of Figure(s) XX that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

Following are some further example embodiments of the invention. These are presented only by way of example and are not intended to limit the scope of the invention in any way.

Embodiment 1. A method, comprising: determining partition information associated with a virtual disk, determining a volume configuration for each partition associated with the virtual disk, mounting each partition as a separate file, serving the remounted partitions as a logical volume, and extracting metadata from the logical volume.

Embodiment 2. The method of embodiment 1, further comprising extracting metadata in a continuous read information with a read algorithm.

Embodiment 3. The method of embodiment 1 and/or 2, wherein the read algorithm is adapted to the volume configuration.

Embodiment 4. The method of embodiment 1, 2 and/or 3, wherein the volume configuration is simple, linear, spanned, striped, RAID, or combination thereof.

Embodiment 5. The method of embodiment 1, 2, 3 and/or 5, further comprising determining raw metadata from each partition, wherein the volume configurations are determined from the raw metadata.

Embodiment 6. The method of embodiment 1, 2, 3, 4, and/or 5, further comprising storing the extracted metadata in a catalog.

Embodiment 7. The method of embodiment 1, 2, 3, 4, 5, and/or 6, further comprising serving the remounted partitions as a single logical volume that is configured to be read contiguously.

Embodiment 8. The method of embodiment 1, 2, 3, 4, 5, 6, and/or 7, further comprising extracting the metadata during a backup operation of virtual machines or after the backup operation.

Embodiment 9. The method of embodiment 1, 2, 3, 4, 5, 6, 7, and/or 8, wherein the logical volume includes the files associated with the partitions.

Embodiment 10. A method for performing any of the operations, methods, or processes, or any portion of any of these, disclosed herein.

Embodiment 11. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Any one or more of the entities disclosed, or implied, by the Figures and/or elsewhere herein, may take the form of, or include, or be implemented on, or hosted by, a physical computing device. As well, where any of the aforementioned elements comprise or consist of a virtual machine (VM), that VM may constitute a virtualization of any combination of the physical components.

In the example, the physical computing device includes a memory which may include one, some, or all, of random access memory (RAM), non-volatile memory (NVM) such as NVRAM for example, read-only memory (ROM), and persistent memory, one or more hardware processors, non-transitory storage media, UI device, and data storage. One or more of the memory components of the physical computing device may take the form of solid state device (SSD) storage. As well, one or more applications may be provided that comprise instructions executable by one or more hardware processors to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    determining partition information associated with a virtual disk, wherein the partition information includes a start sector, an end sector, a partition size, and a partition type;
    determining raw metadata from each partition, wherein the raw metadata includes mapping data;
    determining a volume configuration for each partition associated with the virtual disk based on the partition information, and the raw metadata;
    remounting each partition as a separate file corresponding to the volume configuration;
    serving the remounted partitions as a logical volume; and
    extracting metadata associated with the partitions from the logical volume.

2. The method of claim 1, further comprising extracting metadata in a continuous read information with a read algorithm.

3. The method of claim 2, wherein the read algorithm is adapted to the volume configuration.

4. The method of claim 3, wherein the volume configuration is simple, linear, spanned, striped, RAID, or combination thereof.

5. The method of claim 1, further comprising storing the extracted metadata in a catalog.

6. The method of claim 1, further comprising serving the remounted partitions as a single logical volume that is configured to be read contiguously.

7. The method of claim 1, further comprising extracting the metadata during a backup operation of virtual machines or after the backup operation.

8. The method of claim 1, wherein the logical volume includes the separate files associated with each of the partitions.

9. A non-transitory storage medium having stored therein instructions that are executable by one or more hardware processors to perform operations comprising:

determining partition information associated with a virtual disk, wherein the partition information includes a start sector, an end sector, a partition size, and a partition type;

determining raw metadata from each partition, wherein the raw metadata includes mapping data;

determining a volume configuration for each partition associated with the virtual disk based on the partition information and the raw metadata;

remounting each partition as a separate file;

serving the remounted partitions as a logical volume; and extracting metadata associated with the partitions from the logical volume.

10. The non-transitory storage medium of claim 9, further comprising extracting metadata in a continuous read information with a read algorithm.

11. The non-transitory storage medium of claim 10, wherein the read algorithm is adapted to the volume configuration.

12. The non-transitory storage medium of claim 11, wherein the volume configuration is simple, linear, spanned, striped, RAID, or combination thereof.

13. The non-transitory storage medium of claim 9, further comprising storing the extracted metadata in a catalog.

14. The non-transitory storage medium of claim 9, further comprising serving the remounted partitions as a single logical volume that is configured to be read contiguously.

15. The non-transitory storage medium of claim 9, further comprising extracting the metadata during a backup operation of virtual machines or after the backup operation.

16. The non-transitory storage medium of claim 9, wherein the logical volume includes the separate files associated with each of the partitions.

* * * * *